United States Patent

Shuman

[15] 3,636,408
[45] Jan. 18, 1972

[54] TAPE DISPENSER WITH STATIC ELECTRICITY NEUTRALIZER

[72] Inventor: Joseph George Shuman, Scotch Plains, N.J.

[73] Assignee: Technical Tape Corp., New Rochelle, N.Y.

[22] Filed: May 26, 1970

[21] Appl. No.: 40,501

[52] U.S. Cl. ..................317/2 R, 83/649, 225/6, 242/55, 242/55.2
[51] Int. Cl. ..................H05f 3/00
[58] Field of Search..................317/2 R, 2 A, 2 D

[56] References Cited

UNITED STATES PATENTS

| | | | |
|---|---|---|---|
| 577,300 | 2/1897 | Harris | 317/2 A |
| 882,536 | 3/1908 | Prouty | 317/2 A |
| 1,396,318 | 11/1921 | Bunger | 317/2 R |
| 2,264,683 | 12/1941 | Smith | 317/2 R |
| 2,822,509 | 2/1958 | Harvey | 317/2 R |
| 3,542,578 | 11/1970 | Lang | 317/2 A |

Primary Examiner—L. T. Hix
Attorney—Robert S. Dunham, P. E. Henninger, Lester W. Clark, Gerald W. Griffin, Thomas F. Moran, R. Bradlee Boal, Christopher C. Dunham and Robert Scobey

[57] ABSTRACT

Dispenser for film tapes such as pressure-sensitive adhesive tapes includes a rotatable mounting for a coil of tape so that the tape may be progressively uncoiled upon rotation of the coil and a selective device for dispensing portions of the tape as it is uncoiled. Static electricity on the tape is neutralized during uncoiling by either drawing the tape past a number of electrical conductors, e.g., grounded wires, disposed near the tape or applying to the tape a static neutralizing volatile fluid which is permitted to evaporate before or as the tape is dispensed.

8 Claims, 8 Drawing Figures

PATENTED JAN 18 1972
3,636,408
SHEET 1 OF 2
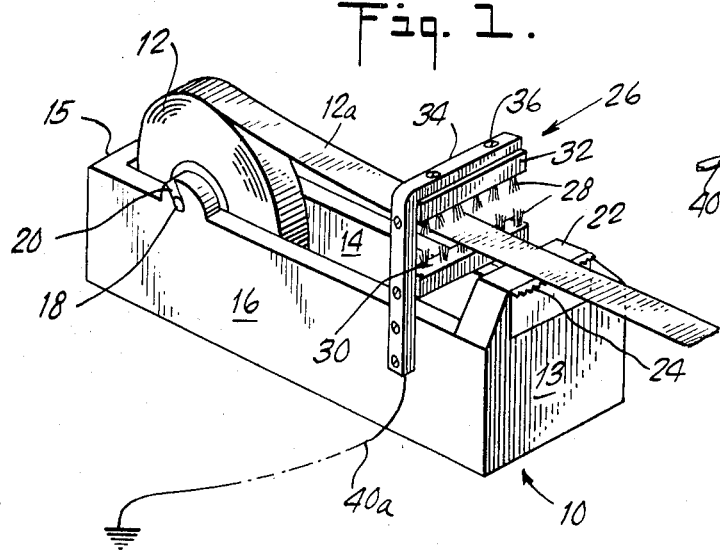
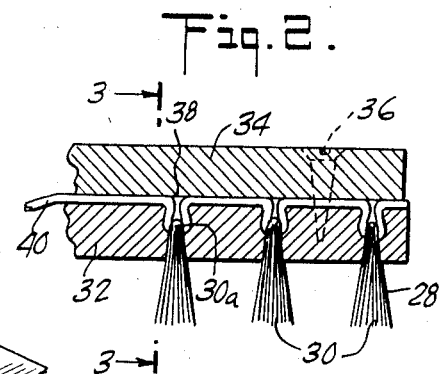
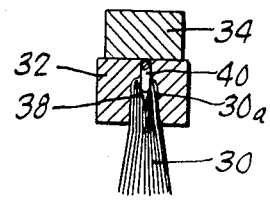
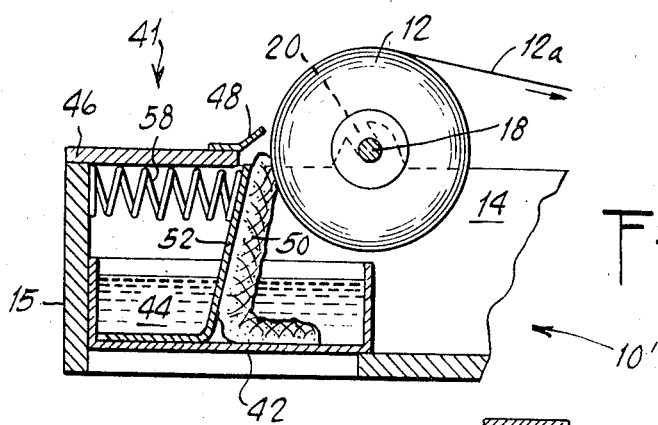
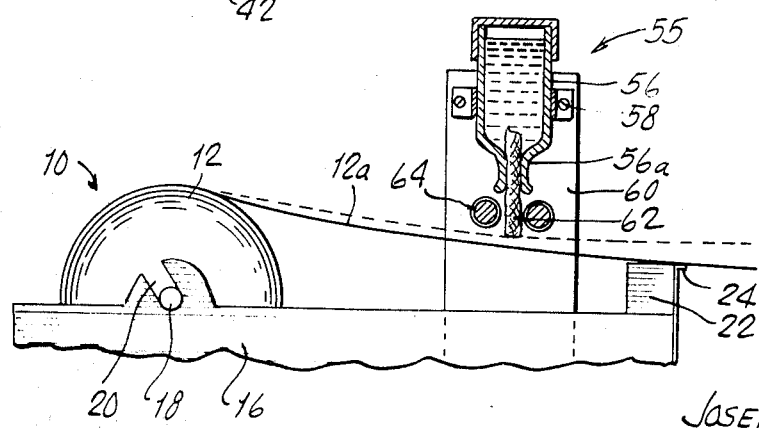
INVENTOR.
JOSEPH GEORGE SHUMAN
BY Robert S. Dunham
ATTORNEY INVENTOR.
JOSEPH GEORGE SHUMAN
BY Robert S. Dunham
ATTORNEY

TAPE DISPENSER WITH STATIC ELECTRICITY NEUTRALIZER

BACKGROUND OF THE INVENTION

This invention relates to discharging or neutralizing static electricity in the dispensing of tape. More particularly, the invention is directed to a novel means of neutralizing static electricity on adhesive tape, especially tape consisting of plastic film, as the tape is drawn from a dispenser and just prior to its application to a substrate.

Very thin film tapes, such as those made from "Mylar" polyester (a product of duPont), polypropylene, vinyl or other plastic materials, and sometimes carrying pressure-sensitive adhesive on one face, are extensively used in the electrical industry, as for instance in assembly operations where the worker must tear off small lengths of tape from a dispenser and wrap them around successive parts. Such tapes are characterized, however, by the high charges carried on their surfaces. Thus, the tape tends to cling to the user's hands, extraneous objects, and even to itself. This slows down the level of production and creates a substantial waste of both time and material. Elimination of the static electricity upon manufacture of the tape or upon formation of the coils of tape is not sufficient as the static changes return to the tape during dispensing even before the tape may be utilized. The problem is notably aggravated in the case of extremely thin tape, for example in that polyester (Mylar) pressure-sensitive tape having a thickness of 1 mil or less is partially impossible to use in manual dispensing operations, although it is otherwise fully satisfactory for many insulating or protective functions. Hence, industrial users have employed much thicker tapes, for instance 2 mils or more, wherein the effect of static charge is less unmanageable, although still undesirably present; this represents a substantially proportionately greater cost for tape, e.g., twice as much.

In spite of these difficulties, it does not appear that any solution has been found, even though neutralization of electrostatic conditions has been practiced in other circumstances; feasibility or adaptability of such remedies to manual-type tape dispensers for small amounts of relatively narrow tape have not been indicated nor has it been evident that there was any way in which static trouble could be overcome in these dispensing devices or operations. Indeed, in general, static electricity neutralizers appear to have been available or proposed heretofore only in connection with the manufacture and winding of continuous webs or the like, e.g., constantly traveling, wide or very long sheets or strips of plastic, fabric and similar materials. Such means have been largely designed to avoid hazards or the like peculiar to continuously operating machines or systems, as for example to avoid sparking or shock dangers, but have not been applied to neutralize static electricity during unwinding in a dispenser just prior to use, such as in dispensing of thin film tapes. Moreover, even though static is eliminated in manufacturing the tape, it is created all over again in use of the dispenser, yet it has not heretofore been perceived that static should or could usefully be neutralized in the act of dispensing selected pieces by the user.

Thus, among four general forms of static electricity neutralizers, one type has employed a radioactive substance located adjacent the sheet or strip material to eliminate static electricity thereon by means of alpha rays emitted by the substance, as for instance in Smith U.S. Pat. No 2,264,683. Another method for neutralizing static charge involves the application of high voltage to the material, from a suitable source. A transformer, for instance, supplied a "live" conductor from one terminal while being grounded at its other terminal so that a difference in potential is created between the conductor and the ground. The transformer and auxiliary equipment needed are expensive and bulky in relation to such an installation as might constitute an adhesive tape dispenser, there being moreover a possible electrical hazard to the operator due to the presence of a high voltage. Thus, cost, size, and safety hazards, or the need for special insulating structure, preclude devices of this sort.

Still another type of neutralizer for static electricity is shown in the U.S. Pat. to Beach, No. 2,449,972, being used for wide, continuous material in sheet form passing between rolls or to or from rolls or the like. In such device, a long bar extends above the continuously passing web, across the same, and carries wire bristles that are disposed along the bar and grounded to the processing machine. Ionization of the air between the discharge device and the electrified material to be discharged occurs from the electric field created by the static electricity located on the material as the field converges on the grounded wire bristles. This convergence of the electric field onto the wire bristles is the effect of a point conductor which is caused, as by grounding, to have a polarity opposite to that of a large charged area which it faces. The wire bristles are energized only when the material is electrified; the higher the electrification, the greater the ionization of the air.

As indicated, a primary purpose of static neutralization by such means has been to avoid safety hazards such as sparking in potentially combustible atmospheres or circumstances or to avoid unpleasantly electrified rolls of material which can create shocks on immediate handling, use of these systems being generally related, and indeed essentially restricted, to automatic machinery or the like in the manufacture and processing of sheet or fabric materials.

Still another means of electrostatic discharge or prevention has involved the application of particular fluid compounds to the material requiring such treatment, usually liquid containing dissolved ionic substances. Although a variety of compounds of this sort have been suggested, commercial applications have again been related to continuously traveling webs or sheets, with specific transfer devices and compositions appropriate in such circumstances. The use of the sheets and other articles have apparently been such that a conductive residue has posed no problem. Indeed in a number of cases, the object has been to leave a deposit of an electrically conductive substance on the material to preclude electrostatic buildup, such being a concept inconsistent with the handling of a material such as plastic tape in situations where it is used for electrical insulating functions and must not become conductive at all.

An important object of the present invention is to provide a film or like tape dispenser with an efficient yet simple static electricity neutralizer. It is a particular aim of the invention to provide apparatus and method for discharging the static electricity on thin film tapes immediately before use in order to prevent the buildup of static charges which create handling difficulties resulting in waste and low productivity. It is yet a further object of the invention to provide a static electricity neutralizer that is completely safe to the user while not requiring extensive capital investment.

SUMMARY OF THE INVENTION

To the above and other ends, the method of the invention comprises rotatably mounting a coil of adhesive tape or other film or like tape such that the tape may be progressively uncoiled upon rotation, selectively dispensing portions of the tape upon uncoiling, and neutralizing static electricity on the tape between the mounting and dispensing operations as the tape is uncoiled. Neutralizing the static electricity may take the form of drawing selected portions of the tape past a plurality of electrical conductors or applying to the tape a static neutralizing volatile fluid.

In accordance with the first form of the invention, static electricity on the tape is discharged by plural electrical conductors disposed adjacent at least one side of the tape and transversely thereto. Each of the conductors is a pointed member, e.g., a short length of wire, extending toward but spaced from the adjacent side of the tape. Groups of the wire members are formed into tufts which are arranged about and are supported by an insulator, the tufts being electrically connected together and to ground. Ionization of the air between the tips of the wire members and the tape results in neutralization of the static charges on the tape. It is also contemplated to provide conductors adjacent both sides of the tape where in a particular application this is deemed necessary for effective discharge of the static electricity. In any event the static electricity neutralizer is preferably located in the area of dispensing of the tape so that static electricity is discharged immediately prior to employment of the tape; this prevents a rebuildup of the static charges.

In another form of the invention, a volatile fluid is applied to at least one side of the tape before dispensing, preferably the side not containing adhesive, the fluid being permitted to evaporate before the tape is utilized. When the volatile fluid is relatively electrically conductive, the static electricity on the tape is discharged. It is believed that discharging occurs when the free ions of the fluid and the static charges on the tape combine. The volatile fluid may be applied to the tape in either of several ways—by transferring the fluid from a reservoir disposed adjacent the coil of tape or a strip thereof through a wick biased against the coil or strip, or by allowing the fluid to flow from a reservoir onto a wick, a roller or a series of rollers that applies the fluid to the passing tape—or by any combination of these methods. When the tape is fabricated of a polyester film material, the volatile fluid preferably is an aqueous solution of ethyl alcohol or isopropyl alcohol, e.g., in proportions such as exemplified below.

By providing the described apparatus of either embodiment of simple yet effective static electricity neutralizer for a tape dispenser is achieved which fulfills the defined aims of the invention, and which is especially applicable to the situation, such as that of pressure-sensitive adhesive tape for electrical purposes, when the tape is expected to be dispensed and applied in dry, unmoistened state and indeed without modification in its composition or by addition of anything to its surfaces. The invention, in particular, achieves a new result of special and distinctive advantage in the manual dispensing of thin plastic film tape, namely in avoiding the unmanageable tendency of electrostatically charged tape to adhere to other objects or itself, or the operator's hands. With the described devices, extremely thin tape such as adhesive tape is fully usable, e.g., tape as thin as 1 mil or less, thus greatly reducing the cost of tape itself for many industrial operations, especially where thinner tapes otherwise meet all necessary requirements.

BRIEF DESCRIPTION OF THE DRAWINGS

FIG. 1 is a perspective view of a tape dispenser provided with representative apparatus in accordance with one embodiment of the invention;

FIG. 2 is a fragmentary elevational view, chiefly in section, showing the manner in which the electrical conductors of FIG. 1 are affixed to an insulator;

FIG. 3 is a section on line 3—3 of FIG. 2;

FIG. 6 is a fragmentary vertical section of a tape dispenser provided with representative apparatus in accordance with a second embodiment of the invention;

FIG. 7 is a fragmentary side elevational view, partly in section, of a modified form of the embodiment of FIG. 6.

DETAILED DESCRIPTION

Figure 4:
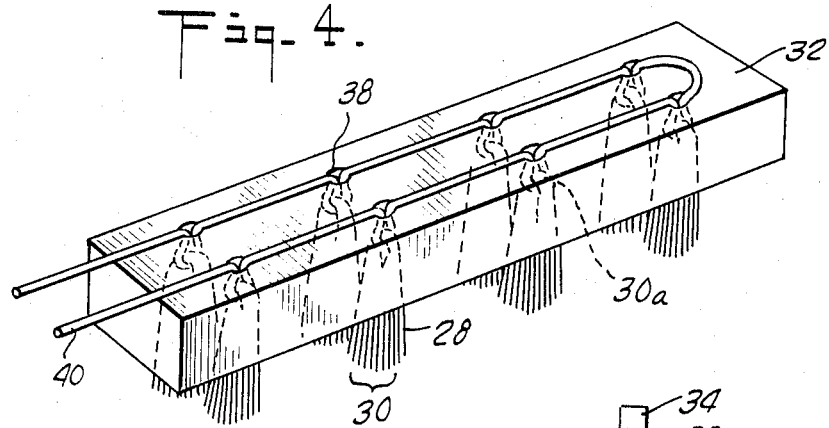
FIG. 4 is a perspective view of an arrangement of the electrical conductors used in the apparatus of FIG. 1.

Referring to the drawings, the complete apparatus there shown includes a tape dispenser 10 for containing a coil of film tape 12 such as pressure-sensitive adhesive tape and dispensing strips 12a of tape therefrom. The tape dispenser 10 may be of any suitable size and form, including industrial-type units handling tape rolls 4 inches or more in diameter. In the embodiment shown in FIG. 1 the tape dispenser 10 is conventionally relatively box shaped and is comprised of four enclosing walls 13, 14, 15 and 16, the walls 13 and 15 forming the front and rear of the dispenser respectively and the walls 14 and 16 forming the sides of the dispenser. A bottom (not shown) can also be provided for the dispenser 10.

The coil of film tape 12 is mounted within the tape dispenser 10 such that its central axis is disposed horizontally therein. A spindle 18 is disposed through the central axis of the coil 12, the ends of the spindle 18 being mounted within directly opposing recesses, e.g., notches 20, located in the respective walls 14, 16. The notches 20 are suitably oriented, for example upwardly and rearwardly, and are sufficiently spaced from the bottom of the dispenser that a complete coil of tape 12 may be readily installed in and rotatably mounted within the dispenser. The orientation of the notches 20 prevents the coil 12 from becoming detached from the dispenser 10 upon rotation of the coil. In the conventional manner, a strip 12a of tape is drawn tangentially from the uppermost portion of the coil 12. As the coil 12 has its spindle 18 mounted in the notches 20, the coil is permitted to rotate about the spindle 18 upon tangential pulling of the strip 12a. A tape ledge 22, which may be an upward extension of the front wall 13, supports the strip 12a of tape which is drawn from the coil 12. Affixed to the upper portion of the tape ledge 22 is a cutting edge 24 of a conventional type for dispensing selected portions of tape. If nonadhesive tape is used with the apparatus of the invention, a brake device (not shown) adjacent the coil of tape 12 is desirable to prevent overrunning upon rotation of the coil. For simplicity of illustration, further functional details usually appropriate to articles of this class are omitted from the drawings. It will also be understood that an alternative tape dispenser 10 might be provided in lieu of the one shown so long as the dispenser employed is capable of allowing a coil of tape 12 to rotate such that strips 12a of tape may be selectively drawn therefrom and severed.

For the purposes of the present invention, thin film tapes fabricated of, for example, "Mylar" polyester (a trademark of duPont), polypropylene, vinyl, acetate, cellulose butyrate or other plastic material are contemplated to be utilized with the tape dispenser 10. The tape may be of the pressure-sensitive or heat-sensitive type, as to its adhesive, or of any other type commonly formed in a coil and adapted to be dispensed (as dry tape) by a tape dispenser. It should be realized that tapes of other compositions could also be dispensed using the apparatus and method of the present invention but that the above-mentioned tapes are particularly subject to high static charges on their surfaces and therefore are particularly benefited by static electricity neutralization as provided by the instant invention.

FIGS. 1 through 5

In accordance with one, usually advantageous embodiment of the invention, static electricity on the strip 12a drawn from the coil 12 of tape is discharged by a static electricity neutralizer 26. In the particular form shown in FIG. 1, the static electricity neutralizer 26 comprises a plurality of electrical conductors 28 extending toward and disposed adjacent at least one side of the strip 12a between the mounted coil 12 and the cutting edge 24 of the tape dispenser 10. It is particularly advantageous that the static electricity neutralizer 26 be disposed at a point immediately adjacent the cutting portion of the dispenser as if the tape is neutralized before it is unwound, static charges will tend to rebuild on the tape before use, thus negating the effect of the static electricity neutralizer. The conductors 28 are disposed transversely to the plane of the strip 12a of tape and although directed toward the strip 12a are spaced therefrom. Preferably, the conductors 28 are also spaced from the strip 12a a sufficient distance so that an airgap exists between the conductors and the strip while the strip is being drawn from the dispenser. This spacing increases the efficiency of static neutralization. Preferably also, the conductors 28 are sufficiently flexible that they will not tear or otherwise damage the tape if the tape contacts the conductors as it is drawn past them.

The electrical conductors 28 neutralize the static charges on the adjacent surface of the strip 12a as the tape is dispensed from the tape dispenser 10. This result is understood to be accomplished by ionizing the molecules of air at the ends of the conductors 28 through the development of an exceedingly high potential gradient. Due to the potential gradient, lines of electric force resulting from the static charges on the strip 12a will converge upon the ends of the conductors. Ionization of the air adjacent to the ends of the conductors 28 provides free charges for neutralization of the static charges on the strip 12a of tape. The air between the ends of the conductors 28 and the strip 12a is ionized so that it contains equal numbers of positive and negative charges. Static charges on the strip 12a may be either positive or negative and these charges strongly attract the charges of opposite polarity in the air. When ions of opposite polarity meet, they naturally combine to form neutral molecules. For example, if there is an excess of positive charges on the surface of the tape, they will be neutralized by the negative charges of the ionized air. The remaining positive charges in the air will then be bled to ground. If the tape is negatively charged, the action is the same, but reversed.

By providing a large number of conductors 28, a large volume of intervening air may be rapidly ionized. To provide a convergent field preferred to develop the high potential gradient, it is important that the ends of the conductors 28 be spaced from the charged surface of the tape so as to collect the convergent energy from an appreciable area of the tape. Furthermore, the ends of the conductors should be located at an appreciable distance from their support so that the lines of force concentrate upon the conductor rather than upon the support. Although the ends of the conductors should be spaced from the tape being drawn past the conductors 28, it is not necessary that the space have any particular dimension but only that it be sufficient to prevent the strip 12a from normally contacting the conductors 28 as it is pulled past, as contact reduces the efficiency of neutralization. Because each conductor contains an extremely small electrical capacitance and because the high potential gradient creates what is in effect a large flow of neutralizing ions between the relatively sharp ends of the conductors and the face of tape, spark breakdown is avoided so that although static electricity is discharged, the system is always in electron balance and there are no electric sparks or shocks when the user touches the tape and any fire hazard due to sparking is avoided.

Each of the conductors 28 comprises a pointed member fabricated, for example, of wire such as tempered brass or other good conducting metal approximately 0.003 to 0.005 in. in diameter. Although the wire members may be individually provided with pointed ends, if the wire members are of fine wire initially, it will not be necessary to further sharpen their ends. The wire members are electrically connected together as explained below. It is presently preferred that groups of the wire conductors 28 be formed into tufts of wires 30. It is relatively easier to handle tufts 30 of wire members than to direct a large number of individual wire members in a manner such that static electricity on the strip 12a is discharged.

The tufts 30 of pointed wire conductors 28 are arranged about and are supported by an insulator 32. This insulator 32 prevents the wire members from contacting one another. The insulator 32 is disposed parallel to the plane of the strip 12a of tape but extends transversely of the tape path so that a line of tufts 30 may be arranged substantially across the width of the strip 12a. The insulator 32 may be fabricated of plastic, or preferably hard wood, or other suitable dielectric material that does not conduct electricity. An angle bracket 34 or other suitable structure that is affixed to the insulator 32 by screws 36 or the like secures the insulator 32 to the tape dispenser 10. It is preferred that the angle bracket 34 also be fabricated of plastic, hard wood, or other insulating material, although this is not essential to efficient operation of the apparatus.

Initially, each wire member comprising a conductor 28 is approximately twice the desired final length. Groups of the wire members are then folded approximately in half longitudinally so as to form tufts 30 of wire members each of substantially the same length. The closed ends 30a of the tufts 30 are located within apertures 38 arranged about and extending through the insulator 32. The pattern of the apertures 38 determines the pattern of the conductors 28 about the insulator 32. A connecting wire 40 extends through each of the apertures 38 in the insulator 32 and is looped through the closed end 30a of each tuft 30, e.g., by pulling the tuft up into the aperture 38 by the wire loop so that the latter is crimped against the fold of the tuft, so that the tufts are electrically connected together. The connecting wire 40 is held in place between the insulator 32 and its respective angle bracket 34 when the insulator and the angle bracket are secured together. An extension of the connecting wire 40 leads from the lower end of the angle bracket 34 to serve as a ground wire 40a. This ground wire 40a is attached to a suitable ground within the vicinity of the tape dispenser 10, e.g., a grounded water pipe or the like.

In FIG. 1 a set of conductors 28 is shown disposed upon each insulator 32. Although one set of conductors 28 will discharge fully static electricity on the adjacent side of a strip 12a of tape, it is preferred that at least one set of conductors 28 be disposed adjacent each side of the strip 12a. This allows for full neutralization of the static electricity on both sides of the strip 12a. However, indirect neutralization of the opposite side of the strip 12a does occur when only one set of conductors 28 is employed. When two opposing sets of conductors are employed, their structure may be as mirror images of each other.

It is also contemplated to dispose more than one set of conductors 28 on each insulator 32, as shown in FIG. 4. There, two sets of conductors 28 are shown disposed on the same insulator 32. In this case the connecting wire 40, after extending the length of the insulator 32 along one set of conductors, doubles back and returns along the second set of conductors, all conductors on the same insulator thus being electrically connected. In other respects the apparatus shown in FIG. 4 is similar to the apparatus shown in FIG. 1. A multiplicity of conductors 28 is desirable for most rapidly or effectively discharging a high concentration of static electricity on the tape. It is not desirable, however, to install an excessively large number of conductors 28 on a single insulator 32 (as by completely filling the latter) as this results in a reduction of potential buildup at the end of each conductor. Hence, the air adjacent the ends of the conductors will be ionized to a lesser degree and the efficiency of static neutralization will be reduced.

Figure 5:
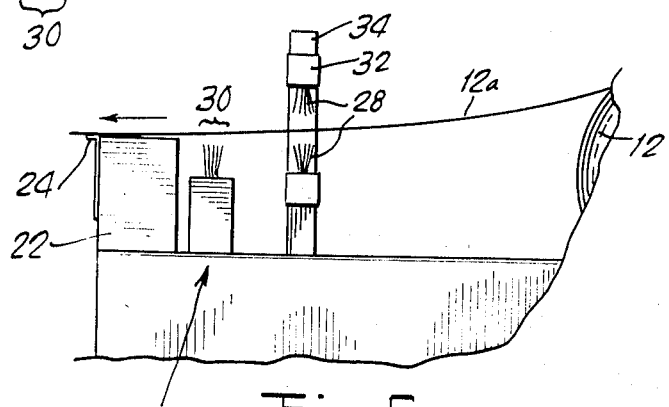
FIG. 5 is a fragmentary side elevational view of a modified form of the embodiment of FIG. 1.

It is further contemplated to provide more conductors 28 adjacent one side of the strip 12a than adjacent the other side of the strip. As shown in FIG. 5, one set of conductors 28 is disposed adjacent each side of the strip 12a in the manner described in connection with the apparatus of FIG. 1. However, if a particular type of tape contains extensive static charges along only one side or has a tendency to rebuild such charges almost immediately after discharging, a second set of conductors 28 may be employed adjacent that side of the strip. For example, in FIG. 5 a second set of conductors 28 is shown disposed adjacent the inside of the strip 12a which generally contains adhesive immediately adjacent the tape ledge 22 at which portions of the tape are severed. The conductors 28 on this supplemental static electricity neutralizer 26a are of the same type and form as those in the previously described neutralizer and are connected to the same ground wire 40a. It should be apparent that any suitable arrangement of neutralizers may be employed with the apparatus of the invention so long as it efficiently removes static electricity from the film tape to be discharged immediately prior to employment of the tape. It is important that all the conductors 28 be grounded, as by means of the ground wire 40a, to achieve the desired removal of excess ions from the ionized air.

To use the apparatus shown in FIGS. 1 through 5, it is first necessary to rotatably mount the coil of film tape 12 such that the tape may be progressively uncoiled upon rotation of the coil. Although in FIG. 1 the coil 12 is shown mounted such that its central axis is disposed horizontally, it is also possible to employ the present invention where the coil 12 has its central axis disposed vertically. Strips 12a of tape are drawn from the outermost convolution of the coil 12 tangentially of the uppermost portion of the coil. The strips 12a are passed over the tape ledge 22 where they are dispensed in appropriate lengths by means of the cutting edge 24. It is also possible, of course, to employ a device for dispensing portions of tape of equal length or a device for separating portions of tape otherwise than by tearing the tape along a cutting edge 24. As the strips 12a of tape are removed from the coil 12, the strips are drawn past the plurality of conductors 28, static electricity on the tape thereupon being neutralized. The conductors 28 are preferably disposed between the coil of film tape 12 and the cutting edge 24 so that the static electricity on the tape is neutralized immediately before the tape is used.

It should be apparent that, the present invention is extremely simple, requiring no excessive manufacturing costs, and can be highly reliable in that there is essentially nothing that can get out of order. The device is safe to the user and the user need not fear for his safety.

In use, it is only necessary that the conductors 28 be grounded and no electric current or power source need be provided for the system.

Figure 8:
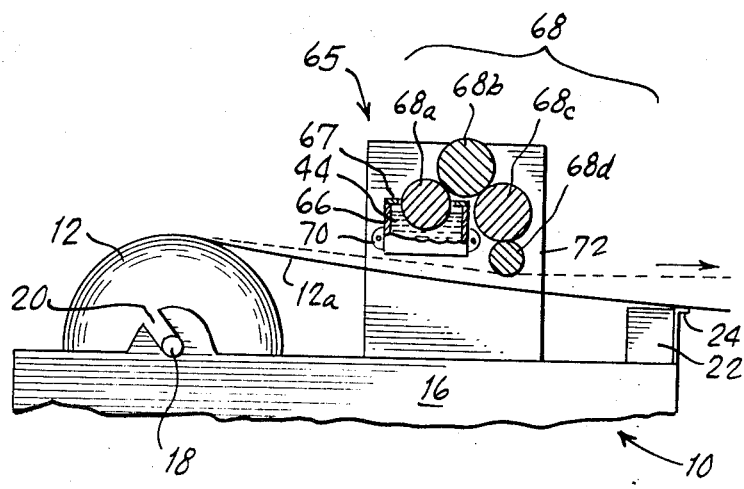
FIG. 8 is a fragmentary side elevational view, partly in section, showing additional modified apparatus of the embodiment of FIG. 6.

FIGS. 6 through 8

A modified embodiment in accordance with the present invention is illustrated in FIGS. 6 through 8. In this embodiment of the invention a static neutralizing volatile fluid is applied to the strip 12a of tape immediately before the tape is dispensed from the tape dispenser. The volatile fluid is relatively ionic or ionized so that it is sufficiently conductive and capable of discharging the static charges on the tape. Thus, the charges will combine upon contact and all will be neutralized. The volatile fluid preferably is of the type which evaporates substantially instantaneously so that the tape is substantially dry when needed for use and so that no residue is left which might permanently adversely affect the dielectric value, insulation resistance or direct electrolytic corrosion factor of the tape.

As illustrated in FIG. 6, the coil 12 of tape is rotatably mounted by means of its spindle 18 disposed within respective notches 20 in the sidewalls 14, 16 of a tape dispenser 10'. The tape dispenser 10' is substantially the same as the tape dispenser 10 illustrated in FIG. 1 but differs therefrom in extending further to the rear of the coil 12 for a purpose more fully explained below.

A static electricity neutralizer 41 is employed to neutralize static charges on the adhesive tape. The neutralizer 41 comprises a reservoir 42 which is disposed at the bottom rear of the tape dispenser 10' and is adapted to contain a volatile fluid 44 to be applied to the tape to neutralize static electricity thereon. The reservoir 42 may be supplied either intermittently or automatically via an inverted bottle of liquid or through a tube (not shown) connecting the reservoir 42 with a larger supply of fluid. As the volatile fluid 44 evaporates rather quickly when contained in an open vessel, a cover 46 should be provided for the reservoir 42, e.g., as a top wall of the tape dispenser 10'. Preferably also, a flexible flap 48 or other device affixed to the edge of the cover 46 rides against the coil of tape 12 as it rotates to extend the closure function of the cover 46 and also to act as a doctor blade to prevent excessive volatile fluid 44 from being carried by the tape. A transfer device such as a wick 50 having one end disposed in the volatile fluid 44 in the reservoir 42 and having its other end positioned against the coil 12 of tape serves to transfer the volatile fluid from the reservoir to the tape. The wick 50 applies the volatile fluid to the outermost convolution of the coil of tape 12 so that as the strip 12a is drawn therefrom the fluid will neutralize the static electricity thereon immediately prior to use while still having an opportunity to evaporate before such use. The wick 50 may be fabricated of any suitable material that transfers a fluid from one location to another. It has been found that a felt or like fibrous material is suitable for this purpose as it transfers an appropriately small quantity of fluid to the tape.

It is preferred that the wick 50 be biased against the coil 12, especially so that as the coil is reduced in diameter upon the dispensing of a quantity of tape, the wick 50 will be continuously maintained against the outermost convolution. As an example of a means for biasing the wick 50 against the coil 12 and with the understanding that alternative forms of devices may be used, there is shown in FIG. 6 a backing plate 52 adjacent the rear side of the wick 50 and a spring 54 disposed under compression between the backing plate 52 and the rear wall 15. The action of the spring 54 maintains the wick 50 against the coil 12 of tape despite the dwindling diameter of the coil.

Several fluids have been found suitable for discharging static electricity upon thin film tapes. Generally, the volatile fluid 44 should be either an aqueous solution of ethyl alcohol or isopropyl alcohol. Thus, a solution of 100 parts absolute ethyl alcohol and 5 parts distilled water has been found suitable. Similarly, a mixture of 100 parts (99 percent pure) isopropyl alcohol with 5 parts distilled water has been successfully employed. Other substances added to the alcohol mixture somewhat increase the effectiveness of the fluid in discharging static electricity. In one formulation, 8 parts acetone, 1 to 5 parts methyl isobutyl ketone (to denature the alcohol), and 26.5 parts distilled water were mixed with 100 parts (95 percent pure) ethyl alcohol. It should be noted that ordinary tap water might be employed instead of distilled water where impurities are not a factor. In order to impart more permanent static discharging properties to the fluid it may be desirable to add 0.25 to 1 part N-(3-dodecyloxy-2-hydroxypropyl) ethanolamine to 100 parts of the last-mentioned formula. However, this compound leaves a conductive residue on the tape and hence may not be advantageously employed in discharging tape used for electrical purposes. It is also contemplated to use 0.5 to 2 parts (50 percent by weight) stearamidopropyl, dimethyl, B-hydroxyethyl ammonium nitrate instead of N-(3-dodecyloxy-2-hydroxypropyl) ethanolamine. Liquids such as methyl ethyl ketone may be of some utility, except with acetate film tape, with which it reacts. It should be apparent from the foregoing formulations that many polar solvents might be employed as the volatile fluid 44 for the purposes of the present invention.

In using the apparatus of the embodiment of FIG. 6, strips 12a of tape are drawn tangentially from the rotatably mounted coil 12. The strips 12a are drawn across the tape ledge 22 (see FIG. 1) where they are selectively dispensed by the cutting edge 24 as the tape is progressively uncoiled from the coil 12. While the tape is being uncoiled, the wick 50 transfers the volatile fluid 44 from the reservoir 42 to the outermost convolution of the coil 12. Preferably, the fluid is applied to the outside of the tape, e.g., the nonadhesive side of adhesive tape, as the tape is uncoiled so that the fluid neutralizes static electricity on the tape and then substantially evaporates before portions of the tape are dispensed. The apparatus shown in FIG. 6 is relatively easy to install and maintain, and sufficiently discharges the static electricity on the tape without any danger to the operator. The static electricity neutralizer 41 is completely contained within the tape dispenser 10' and is not noticeable from the exterior of the tape dispenser.

Illustrated in FIG. 7 is a modification of the static electricity neutralizer 41 shown in FIG. 6. This static electricity neutralizer 55 includes a tape dispenser 10, of the same type and arrangement as that shown in FIG. 1, employed to rotatably mount the coil of thin film tape 12. Again the coil 12 has its spindle 18 disposed in notches 20 in the respective sidewalls 14, 16 of the dispenser. Thus, strips 12a may be progressively tangentially drawn from the coil 12 as the coil is rotated. As before, the tape passes over a tape ledge 22 where it is selectively dispensed by means of a cutting edge 24. A volatile fluid 44 of the same composition as that described above is applied to the outside of the tape, e.g., the nonadhesive side of adhesive tape, between the coil 12 and the cutting edge 24. If the fluid 44 is sufficiently volatile, it will substantially evaporate before the tape is used even if applied to the tape immediately prior to its dispensing.

In the embodiment shown in FIG. 7, the volatile fluid 44 is contained in a reservoir 56 disposed above and spaced from the outside surface of the strip 12a of tape, e.g., the nonadhesive side of adhesive tape. The reservoir 56 may be in the form of an inverted bottle, for example, the bottom portion thereof (when viewed in the upright position) being removable so as to act as a cover 58 when the bottle is inverted. The reservoir 56 may be supplied intermittently with fluid or automatically by means of a tube (not shown) which connects the reservoir 56 to a larger external source of fluid. A clamp 58 or the like secures the reservoir 56 to a suitable support 60 which in turn may be secured by any suitable means to one of the sidewalls 14, 16 of the tape dispenser 10. In the neck portion 56a of the reservoir 56 is disposed a transfer device such as a wick 62 for transferring the volatile fluid 44 from the reservoir 56 to the strip 12a of tape as the tape is dispensed.

The wick 62 should be capable of transferring appropriately small amounts of fluid to the passing tape. The wick 62 may be fabricated of a felt material (as is the wick 50) or preferably of a sponge material. A sponge wick is preferred to a felt wick as a sponge wick does not transfer an excessive amount of fluid in a downward direction. The end of the wick 62 should be spaced from the rest position of the strip 12a, as when the strip 12a is pulled by the operator it rises to a higher level in the dispenser 10. Thus, the wick 62 should be positioned so that it does not contact the strip 12a until the strip is drawn by the user. To prevent the wick 62 from being damaged upon the rise of the strip 12a to a higher level, and to restrict the amount of fluid dispensed to a sufficient degree for wetting the tape, a pair of rollers 64 is provided, one at the front and one at the rear of the wick 62 relative to the dispenser. The wick 62 should extend, however, a slight distance below the rollers 64 so that it contacts the strip 12a of tape. Moreover, the rollers 64, which are preferably fabricated of a resilient material covered with a rubber material, serve to remove excess fluid applied to the tape. Aqueous solutions of ethyl alcohol and isopropyl alcohol (as described above) have been found suitable for discharging the static electricity on the tape when the apparatus shown in FIG. 7 is employed.

The static electricity neutralizing apparatus 55 of FIG. 7 is utilized only when the film tape is drawn progressively from the coil of tape 12 that is rotatably mounted in the tape dispenser 10. As strips 12a of tape are tangentially drawn from the coil 12, fluid 44 is applied to the outside of the tape by means of the wick 62, which transfers the volatile fluid 44 from the reservoir 56 to the tape. The rollers 64 serve to prevent the wick 62 from being displaced and to prevent deposit of excess fluid on the tape. After receiving volatile fluid from the static electricity neutralizer 55, portions of the tape are selectively dispensed by means of the cutting edge 24. As the static electricity neutralizer 55 is disposed adjacent the cutting edge 24, static charges do not have an opportunity to rebuild on the tape after being discharged. The present device is simple in operation, easy to maintain, relatively inexpensive and safe to use.

In FIG. 8 there is shown another modification of the static electricity neutralizer 41. As in the embodiment of FIG. 7, a coil 12 of tape is rotatably mounted by its spindle 18 disposed in notches 20 in the respective sides 14, 16 of the tape dispenser 10. Strips 12a of tape are drawn progressively from the coil 12 over a tape ledge 22 where they are selectively dispensed by means of a cutting edge 24. Volatile fluid 44 is applied to the outside of the strip 12a of tape between the coil 12 and the cutting edge 24 to neutralize the static electricity present on the tape. The volatile fluid 44 is permitted to substantially evaporate before the tape is employed.

In this embodiment the static electricity neutralizer 65 comprises a reservoir 66 and a series of transfer rollers 68, arranged in mutual contact and preferably covered with resilient material such as rubber. The reservoir 66 is adapted to contain the volatile fluid 44 and may be of any suitable shape. The volatile fluid 44 may be charged into the reservoir 66 either intermittently or through a tube (not shown) connecting the reservoir 66 to a larger external source of fluid. A cover 67 is provided for the reservoir 66 to prevent the volatile fluid from rapidly evaporating. The reservoir 66 is affixed by means of a clamp 70 or the like to a suitable support 72 which in turn is affixed by any suitable means to one wall 14, 16 of the tape dispenser 10. The volatile fluid 44 may be of the same type and nature as that described in connection with the embodiment of FIG. 6.

In the representative apparatus shown in FIG. 8, the rollers 68 transfer the volatile fluid 44 from the reservoir 66 to the nonadhesive side of the passing tape. The rollers 68 are set into motion seriatim upon tangentially pulling the strip 12a of tape from the coil 12 and the rollers 68 may also, if desired, be suitably geared to each other (not shown) to ensure positive rotation of the entire train of rollers. Contact occurs between the last roller 68d of the series of rollers 68 and the strip 12a, causing the roller 68d to rotate. Rotation of roller 68d causes sequential rotation of the other rollers in the series 68c, 68b and 68a, all of which are journaled in the support 72. The first roller 68a of the series of transfer rollers 68 is partially disposed through the cover 67 into the volatile fluid 44 in the reservoir 66. Rotation of the roller 68a initiates the transfer of volatile fluid 44 from the reservoir 66 toward the strip 12a of tape. As roller 68a is rotated, fluid thereon is transferred to roller 68b and subsequently to rollers 68c and 68d. When roller 68d received the volatile fluid 44, it transfers the fluid to the passing strip 12a of tape. Preferably, the roller 68d is spaced from the rest position of the strip 12a, as the strip 12a tends to rise in the dispenser 10 upon pulling of the strip by the operator. Thus, no fluid is transferred to the strip 12a until the series of rollers 68 is set in motion by uncoiling of tape from the coil 12. It should be noted that any number of rollers 68 may be employed to transfer the volatile fluid 44 and the invention is not limited to any specific number of such rollers.

As the static electricity neutralizer 65 is disposed between the coil of tape 12 and the cutting edge 24, the volatile fluid 44 is applied to the tape immediately prior to use. The volatile fluid neutralizes the static electricity on the tape and then rapidly evaporates so that the tape may be employed. Again, the device is simple to install and operate and requires little investment. No danger is present to the operator. As with all the described embodiments of the invention, the operator need pay little if any attention to the static electricity neutralizer and need concern himself only with the particular operation in which he is engaged. The operator will find that thin film tape dispensed from a tape dispenser employing the present invention will be noticeably free of static charges and may be utilized in his operation without difficulty. The invention is of unusual significance for pressure-sensitive adhesive tape, in that on the one hand the effects of static charge can be almost insuperable in causing the tape to stick to itself, especially when one portion of the adhesive face comes in contact with another such area, and on the other hand, the need to minimize physical contact with the adhesive face had undoubtedly heretofore constituted an apparent obstacle to the use of any treatments or devices in connection with the tape. As has been demonstrated, however, the invention effectively eliminates the unmanageable properties of static-prone adhesive tape as it is drawn from the dispenser, and does so without in any way affecting or even touching the sensitive adhesive surface.

I claim:

1. Apparatus for dispensing film tape while neutralizing static electricity thereon, comprising:
   a. means rotatably mounting a coil of said tape such that said tape may be progressively uncoiled upon rotation of said coil; and b. means for selectively dispensing portions of said tape as said tape is progressively uncoiled from said coil;

wherein the improvement comprises:

c. a plurality of electrically conductive means disposed adjacent at least one side of said tape transversely thereto between said mounting and dispensing means for neutralizing static electricity on said tape as said tape is uncoiled from said coil, said plurality of conductive means comprising a multiplicity of pointed conductive members extending toward the adjacent side of the tape, said members being electrically connected together and having means for connecting them to ground.

2. Apparatus according to claim 1, wherein said pointed members are wires grouped in tufts and extending toward but spaced from the adjacent side of said tape.

3. Apparatus according to claim 1, wherein said pointed members are wires grouped into tufts, each wire of said tuft being of substantially the same length and extending substantially toward the adjacent side of said tape.

4. Apparatus according to claim 3, further comprising insulating means supporting the tufts of wires, said tufts of wires being arranged about and extending from said insulating means.

5. Apparatus according to claim 1, wherein said electrically conductive means are disposed adjacent both sides of said tape.

6. Apparatus according to claim 2, further comprising insulating means affixed to said mounting means near both sides of said tape, said electrically conductive means being arranged with said tufts of wires extending toward both sides of said tape from said insulating means.

7. Apparatus according to claim 1, which includes insulating means spaced from and extending across the path of the tape and in which said plurality of electrically conductive means comprise a multiplicity of wires carried by said insulating means and extending therefrom substantially toward the adjacent side of the tape at localities distributed across said path and in sufficient proximity to the tape for neutralizing static electricity on said tape as said tape is dispensed from said dispenser and just prior to its application to a substrate.

8. A method of dispensing adhesive tape having pressure-sensitive adhesive on at least one side thereof, comprising the steps of:

a. rotatably mounting a coil of said tape such that said tape may be progressively uncoiled upon rotation of said coil; and b. selectively dispensing portion of said tape as said tape is progressively uncoiled from said coil;

wherein the improvement comprises the step of:

c. neutralizing static electricity on said tape between said mounting and dispensing steps by drawing the tape, as it is dispensed, past a plurality of pointed conductors disposed in spaced relation to the tape path and coacting to effect neutralization of charge from the tape, and conducting excess charge from said conductors to ground.

* * * * *

UNITED STATES PATENT OFFICE
CERTIFICATE OF CORRECTION

Patent No. 3,636,408  Dated January 18, 1972

Inventor(s) Joseph George Shuman

It is certified that error appears in the above-identified patent and that said Letters Patent are hereby corrected as shown below:

Col. 1, line 18, after "high" insert --static--;
       line 24, for "changes" read --charges--;
       line 28, for "partially" read --practically--

Col. 4, line 56, for "usually" read --unusually--

Signed and sealed this 18th day of July 1972.

(SEAL)
Attest:

EDWARD M. FLETCHER, JR.　　　　ROBERT GOTTSCHALK
Attesting Officer　　　　　　　　Commissioner of Patents